(12) United States Patent
Holzworth et al.

(10) Patent No.: US 6,999,421 B1
(45) Date of Patent: Feb. 14, 2006

(54) ADJUSTABLE CONNECTION ADMISSION CONTROL METHOD AND DEVICE FOR PACKET-BASED SWITCH

(75) Inventors: H. Paul Holzworth, Raleigh, NC (US); Gary Deval, Raleigh, NC (US); Satoshi Kakuma, Kawasaki (JP); William Lipp, New Haven, CT (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/427,031

(22) Filed: Oct. 26, 1999

Related U.S. Application Data

(60) Provisional application No. 60/105,836, filed on Oct. 26, 1998.

(51) Int. Cl.
    *H04J 1/16* (2006.01)
    *H04J 3/16* (2006.01)
    *H04L 12/28* (2006.01)

(52) U.S. Cl. .................... 370/235; 370/395.2; 370/465
(58) Field of Classification Search ................ 370/230, 370/230.1, 232, 233, 234, 235, 252, 395.1, 370/395.2, 395.21, 395.43, 412, 465, 468, 370/395.4, 395.41
See application file for complete search history.

(56) References Cited

U.S. PATENT DOCUMENTS

| | | | |
|---|---|---|---|
| 5,341,366 A | | 8/1994 | Soumiya et al. |
| 5,555,265 A | | 9/1996 | Kakuma et al. |
| 5,583,857 A | | 12/1996 | Soumiya et al. |
| 5,696,764 A | | 12/1997 | Soumiya et al. |
| 5,751,691 A | | 5/1998 | Soumiya et al. |
| 5,781,531 A | | 7/1998 | Charny |
| 5,881,049 A | * | 3/1999 | Beshai et al. ............... 370/235 |
| 5,909,443 A | | 6/1999 | Fichou et al. |
| 5,936,940 A | | 8/1999 | Marin et al. |
| 5,936,958 A | | 8/1999 | Soumiya et al. |
| 5,949,757 A | | 9/1999 | Katoh et al. |
| 5,991,268 A | * | 11/1999 | Awdeh et al. ............... 370/235 |
| 5,991,812 A | * | 11/1999 | Srinivasan ................. 709/232 |
| 6,014,367 A | | 1/2000 | Joffe |
| 6,023,468 A | * | 2/2000 | Mouen-Makoua et al. ...... 370/395.43 |

(Continued)

*Primary Examiner*—Andy Lee
(74) *Attorney, Agent, or Firm*—Staas & Halsey LLP

(57) ABSTRACT

An adjustable connection admission control method and device for packet-based switches assigns equivalent bandwidths to variable speed connections. The equivalent bandwidths of the variable speed connections are increased or reduced by a scaling factor to achieve an assigned bandwidth. The method and device determine whether to accept or refuse new variable speed connections based on whether the sum of equivalent bandwidths for existing variable speed connections and new variable speed connections exceeds the bandwidth available to variable speed connections. The connection admission control method and device also determines whether to accept or refuse new constant speed and new unspecified connections. For constant speed connections, the sum of existing and new constant speed connections is obtained. If the sum of bandwidths for existing and new constant speed connections exceeds a maximum factor, the bandwidth available to constant speed connections is reduced by a constant speed traffic factor. At least a portion of the unspecified connections do not have a sustained cell rate. The sustained cell rate is determined by multiplying a peak cell rate by an SCR factor. Equivalent bandwidths are assigned to unspecified connections and are increased or reduced by the scaling factor to achieve an assigned bandwidth. New unspecified connections are accepted or refused based on whether the sum of bandwidths for existing and new unspecified connections exceeds a bandwidth available to unspecified connections. The scaling factor, traffic factor, maximum factor, constant speed traffic factor and SCR factor can be adjusted.

54 Claims, 2 Drawing Sheets

U.S. PATENT DOCUMENTS

| | | | |
|---|---|---|---|
| 6,034,945 A | * | 3/2000 | Hughes et al. .............. 370/230 |
| 6,046,981 A | * | 4/2000 | Ramamurthy et al. ...... 370/232 |
| 6,097,699 A | * | 8/2000 | Chen et al. ................. 370/231 |
| 6,104,699 A | * | 8/2000 | Holender et al. ........... 370/235 |
| 6,108,305 A | * | 8/2000 | Charny et al. .............. 370/232 |
| 6,151,305 A | * | 11/2000 | Chen ......................... 370/238 |
| 6,167,445 A | * | 12/2000 | Gai et al. ................... 709/223 |
| 6,215,768 B1 | * | 4/2001 | Kim ........................... 370/230 |
| 6,252,847 B1 | * | 6/2001 | Lee ............................ 370/229 |
| 6,282,197 B1 | * | 8/2001 | Takahashi et al. ........ 370/395.1 |
| 6,304,549 B1 | * | 10/2001 | Srinivasan et al. ......... 370/230 |
| 6,404,738 B1 | * | 6/2002 | Reininger et al. .......... 370/236 |
| 6,442,138 B1 | * | 8/2002 | Yin et al. ................... 370/232 |
| 6,678,245 B1 | * | 1/2004 | Cooper et al. .............. 370/230 |

\* cited by examiner

ADJUSTABLE CONNECTION ADMISSION CONTROL METHOD AND DEVICE FOR PACKET-BASED SWITCH

CROSS-REFERENCE TO RELATED APPLICATIONS

This application is based on and claims priority to U.S. Provisional Application No. 60/105,836, filed Oct. 26, 1998.

BACKGROUND OF THE INVENTION

1. Field of the Invention

The present invention relates generally to controlling the admission of new connections to a packet-based switch. More specifically, the present invention relates to an adjustable connection admission control system for a packet-based switch.

2. Description of the Related Art

FIG. 1 is a schematic view of a conventional packet-based switching system. In FIG. 1, traffic flows from left to right. The interfaces IF1 through IF4 are represented on both the left and right side of a switching matrix. The left interfaces show traffic entering the switching matrix, and the right interfaces show traffic exiting the switching matrix. A user supplies traffic to an interface on the left and takes traffic from an interface (the same interface) on the right. The user may contract for the type of connection needed. For example, the user may contract for a constant bit rate ("CBR") connection, a variable bit rate ("VBR") connection or an unspecified bit rate ("UBR") connection. The user might provide traffic information such as a sustained cell rate, a peak cell rate, a maximum burst size, etc. This traffic information provides the switch with information regarding the maximum bounds for the user's traffic. However, it would be unusual for all users to operate at the maximum bounds. The traffic rate is expected to be bursty and somewhat unpredictable, and the switch can accommodate all traffic that fits with the maximum bounds defined by the traffic information. This presents a problem in resource allocation. That is, it is difficult to determine how many connections can be handled by a switch when the traffic rate of each connection is variable.

One way to address the resource allocation problem is for the switch to assign a nominal bit rate to each requested connection. The number of permissible connections is determined from the nominal bit rate using a connection admission control (also referred to as "CAC") system. CAC must be done for each point of possible congestion. In FIG. 1, the circles represent the points of possible congestion, where connection admission control is used. In general, CAC is done at each egress points. For example, if all users connected to interface 1 transmit at their maximum permissible rate, there may be congestion in the link carrying traffic from interface 1 to the switching matrix. Conventional connection admission control is described in U.S. Pat. Nos. 5,949,757; 5,936,958; 5,751,691; 5,696,764; 5,583,857; 5,555,265 and 5,341,366, which are hereby incorporated by reference.

Connection admission control is based on traffic descriptors such as peak cell rate, sustained cell rate, maximum burst size, cell delay variation tolerance, etc. The CAC mechanism allocates the minimum switch resources necessary to meet the requirements of the requested connection. If sufficient resources are not available, CAC will not complete the connection. Connection admission control is done in different ways for different traffic classes (also referred to herein as different connection types). That is, constant bit rate, variable bit rate and unspecified bit rate connections are treated differently. For non-constant bit rate service, CAC provides statistical multiplexing. Bandwidth for variable bit rate connections is allocated by determining an equivalent bandwidth ("EBW") based on the peak cell rate sustained cell rate and maximum burst size. EBW is also determined based on the link between the switch components being considered. For the link, parameters such as link speed, buffer size, buffer read out rate, and buffer structure (shared or individual) are considered.

To allocate bandwidth for the significantly different types of traffic, connection admission control requires complex mathematical manipulation of data. To provide superior service, it is desirable to allocate resources conservatively. On the other hand, to accommodate more users, it is desirable to allocate resources aggressively. Different switch operators desire a more or less aggressive approach to resource allocation. However, connection admission control is determined in advance by the switch manufacturer. Because of the complexities associated with connection admission control, it cannot be altered by the individual switch operator.

SUMMARY OF THE INVENTION

Accordingly, it is an object of the present invention to allow individual switch operators to customize their switch to allocate resources more or less aggressively.

This and other objects are accomplished by providing an adjustable connection admission control method and device for packet-based switches that assigns equivalent bandwidths to variable speed connections. Equivalent bandwidths are assigned to variable speed connections. The equivalent bandwidths of the variable speed connections are increased or reduced by a scaling factor to achieve an assigned bandwidth. The scaling factor can be adjusted to change the assigned bandwidths. The method and device determine whether to accept or refuse new variable speed connections based on whether the sum of assigned bandwidths for existing variable speed connections and new variable speed connections exceeds the bandwidth available to variable speed connections. The bandwidth available to variable speed connections is increased or reduced by a variable speed traffic factor. The variable speed traffic factor can be adjusted.

The connection admission control method and device also determines whether to accept or refuse new constant speed connections. To do this the sum of bandwidths for existing and new constant speed connections is obtained. If the sum of bandwidths for existing and new constant speed connections exceeds a maximum factor, the bandwidth available to constant speed connections is reduced by a constant speed traffic factor. The maximum factor and the constant speed traffic factor can be adjusted.

The connection admission control method and device also determines whether to accept or refuse new unspecified connections. At least a portion of the unspecified connections do not have a sustained cell rate. The sustained cell rate is determined by multiplying a peak cell rate by an SCR factor, which factor can be adjusted. Equivalent bandwidths are also assigned to unspecified connections. The equivalent bandwidths of the unspecified connections are increased or reduced by the scaling factor to achieve an assigned bandwidth. New unspecified connections are accepted or refused based on whether the sum of assigned bandwidths for existing and new unspecified connections exceeds a bandwidth available to unspecified connections.

An original scaling factor is maintained for all existing variable speed connections. A new scaling factor is used to allocate bandwidth for all new variable speed connections. When an existing variable speed connection is terminated, the amount of assigned bandwidth freed by the termination is determined based on the original scaling factor. The freed up resources, however, are reallocated based on the new scaling factor.

BRIEF DESCRIPTION OF THE DRAWINGS

The invention will be readily understood by reference to the following description of preferred embodiments described by way of example only, with reference to the accompanying drawings in which like reference characters represent like elements, wherein.

DETAILED DESCRIPTION OF THE PREFERRED EMBODIMENTS

Figure 1:
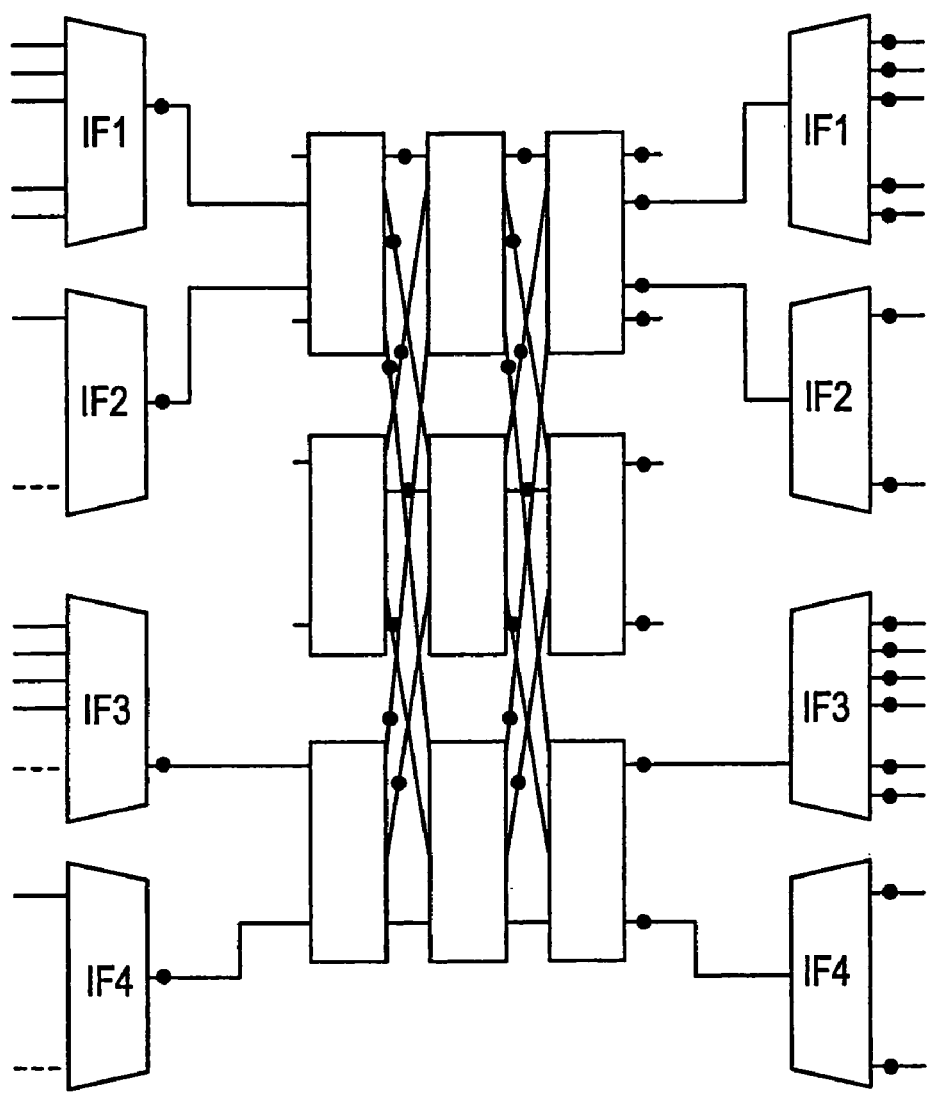
FIG. 1 is a schematic view of a conventional packet-based switching system.
Figure 2:
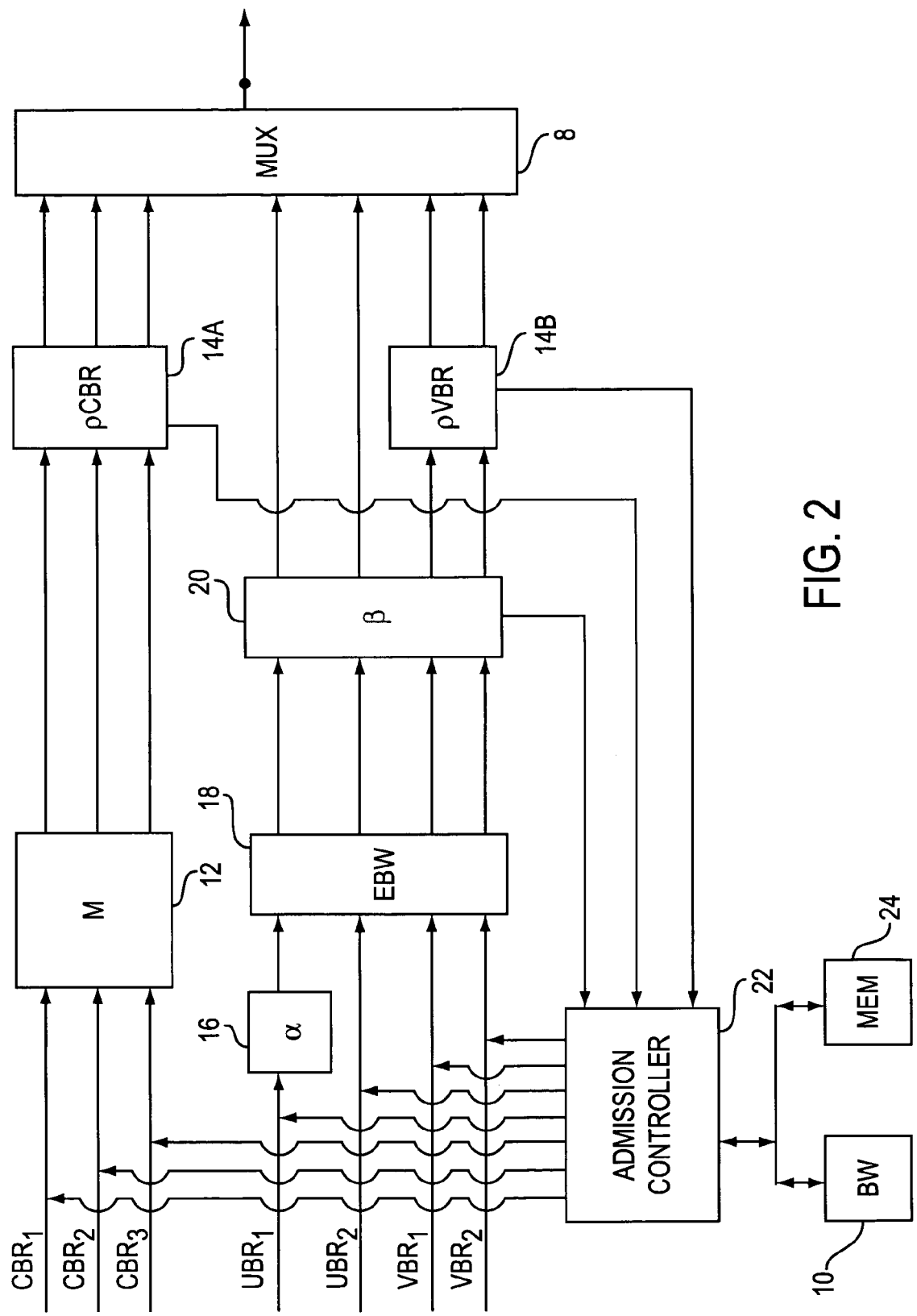
FIG. 2 is a schematic view of an adjustable connection admission control device according to a preferred embodiment of the present invention.

FIG. 2 is a schematic view of an adjustable connection admission control device according to the present invention. The device shown schematically in FIG. 2 would be used at each point of possible congestion, where connection admission control is to be performed. That is, the device shown schematically in FIG. 2 would be used in FIG. 1 at the egress points represented by circles. FIG. 2 shows a plurality of connections being multiplexed onto a single link by multiplexer 8. In describing the present invention, the terms "bandwidth" and "bit rate" are used synonymously, both possibly having units of bits per second.

In the device shown in FIG. 2, different types of connections are treated independently. That is, the total bandwidth available at the egress point, the physical capacity of the link where congestion could occur, is allocated by bandwidth allocator 10 to the different types of connections. New connection(s) of a given type (CBR, UBR or VBR) may be refused if the additional connection(s) will result in a bandwidth which exceeds that allocated for the connection type. Bandwidth allocator 10 can reallocate the bandwidth available at the egress point. For example, if 1 Gbps of bandwidth is available at the egress point, 300 Mbps could be allocated to CBR connections, 300 Mbps could be allocated to UBR connections and 400 Mbps could be allocated to VBR connections. If the volume of CBR traffic is large and the volume of VBR traffic is small, the bandwidth allocator 10 could change the allocation so that 500 Mbps would be allocated to CBR connections and 200 Mbps would be allocated to VBR connections. Allocation allows for CAC to be performed independently for each type of connection. Reallocation minimizes the number of connections that are refused.

FIG. 2 shows three constant bit rate connections $CBR_1$–$CBR_3$ received at a first controller 12. The bandwidth allocated for a constant bit rate connection must at least equal the nominal bandwidth (bit rate) of the CBR connection. If the number of CBR connections is fewer than a maximum number m, the first controller 12 signals CBR traffic controller 14A to operate at 100% efficiency. The value of m can be adjusted by the switch operator when the switch is online (without dropping connections) or offline. At 100% efficiency, the entire bandwidth allocated to CBR connections can be used. That is, new CBR connections can be established if the following equation is satisfied:

$$\Sigma CBR \leq TBW_{CBR} \cdot \rho_{CBR} \tag{1}$$

where $\Sigma$ CBR is the sum of the nominal bit rates for all existing and new CBR connections. $TBW_{CBR}$ is the bandwidth allocated to CBR connections by bandwidth allocator 10. $\rho_{CBR}$ is a CBR traffic parameter, which is equal to "1" for 100% efficiency.

If the number of CBR connections exceeds the maximum number m, first controller 12 communicates with CBR traffic controller 14A to reduce the effective bandwidth available to CBR connections. $\rho_{CBR}$ may be set to 1 for maximum efficiency, but would be reduced to a number between 0 and 1 when the number of CBR connections exceeds the maximum number m. By reducing the value of $\rho_{CBR}$ the switch takes into account the reduced efficiency. The value of $\rho_{CBR}$ can be adjusted by the switch operator when the switch is online (without dropping connections) or offline.

It is important to note that when the value of $\rho_{CBR}$ is reduced while the switch is online, the effective bandwidth available for all CBR connections immediately decreases. Numerically this translates to an over-subscription problem. However, because the actual number of connections has not changed, it is not necessary to release any connections. The general equation to determine whether new CBR connections will be accepted is as follows:

$$CBR_1/\rho_{CBR,1} + CBR_2/\rho_{CBR,2} + CBR_3/\rho_{CBR,3} \cdots + \cdots CBR_n/\rho_{CBR,n} \leq TBW_{CBR} \tag{2}$$

where $CBR_1$ to $CBR_n$ are the nominal bit rates for n CBR connections and $\rho_{CBR,1}$ to $\rho_{CBR,n}$ are the CBR traffic parameters for n CBR connections. The above equation (2) takes into account that different connections may have been established using different values for $\rho_{CBR}$. As mentioned above the value of $\rho_{CBR}$ at peak efficiency (usually 1) will be different from the value of $\rho_{CBR}$ when the number of CBR connections exceeds the maximum number m. Further, the switch operator can manipulate the value of $\rho_{CBR}$ while the switch is online. Usually the switch operator would not change the peak efficiency value of $\rho_{CBR}$ from the default value, 1. However, it is highly possible that the switch operator would change the reduced efficiency value of $\rho_{CBR}$ (greater than m CBR connections) while the switch is online.

For unspecified bit rate UBR connections, the user may or may not specify a sustained cell rate. If the user does not specify a sustained cell rate, the UBR connection is sent to a second controller 16. $UBR_1$ is sent to second controller 16. At the second controller 16, a sustained cell rate is computed based on the peak cell rate. The sustained cell rate is computed by multiplying the peak cell rate by an SCR parameter $\alpha$. The SCR parameter $\alpha$ can be adjusted by the switch operator, and according to one implementation, the range for $\alpha$ is $0 \leq \alpha \leq 2$ with granularity of 0.001.

If the UBR connection has a sustained cell rate associated therewith, it is not necessary to supply the connection to the second controller 16. Referring to FIG. 2, $UBR_2$ has a specified sustained cell rate and is not sent through second controller 16. Both $UBR_1$ and $UBR_2$ are eventually sent to EBW device 18 where equivalent bandwidths (EBWs) are determined in a manner similar to that described in connection with the related art. That is, the equivalent bandwidths are determined based on parameters such as sustained cell rate, peak cell rate, maximum burst size, buffer size, egress location, buffer read-out rate, etc. Once the equivalent bandwidths are determined, they are increased or reduced in third controller 20 by a scaling factor $\beta$. The scaling factor $\beta$ can be adjusted by the switch operator when the switch is online (without dropping connections) or offline. New UBR connections are accepted if the following equation is satisfied:

$$EBW_1 \cdot \beta_1 + EBW_2 \cdot \beta_2 + EBW_3 \cdot \beta_3 \ldots + \ldots EBW_n \cdot \beta_n \leq TBW_{UBR} \quad (3)$$

where $EBW_1$ to $EBW_n$ are the equivalent bandwidths for n UBR connections. $\beta$ is the scaling factor. By using $\beta_1$ to $\beta_n$, the above equation (3) takes into account that different values for $\beta$ may have been used to establish different UBR connections. $TBW_{UBR}$ is the bandwidth allocated to UBR connections by bandwidth allocator 10.

For VBR connections, an equivalent bandwidth is determined by EBW device 18, as described above for UBR connections. Then, the equivalent bandwidth is increased or reduced by the scaling factor $\beta$ and third controller 20. Next, the VBR connections are sent to VBR traffic controller 14B. Here the amount of bandwidth available for VBR connections may be decreased from the amount allocated by bandwidth allocator 10. The amount of available bandwidth is reduced by the VBR traffic parameter $\rho_{VBR}$ in a manner similar to CBR connections. New VBR connections are accepted if the following equation is satisfied:

$$EBW_1 \cdot \beta_1 / \rho_{VBR,1} + EBW_2 \cdot \beta_2 / \rho_{VBR,2} + EBW_3 \cdot \beta_3 / \rho_{VBR,3} + \ldots + \ldots EBW_n \cdot \beta_n / \rho_{VBR,n} \leq TBW_{VBR} \quad (4)$$

where $EBW_1$ to $EBW_n$ are the equivalent bandwidths for n VBR connections. $TBW_{VBR}$ is the bandwidth allocated for VBR connections by bandwidth allocator 10. The above equation takes into account that different values of $\beta$ and $\rho$ may have been used for different VBR connections. $\rho_{VBR}$ may be set independently of $\rho_{CBR}$. Alternatively, the same value may be used for both $\rho_{VBR}$ and $\rho_{CBR}$. For all requested connections, admission controller 22 establishes or refuses the new connection. For this purpose, admission controller 22 is connected to CBR traffic controller 14A for CBR connections, to third controller 20 for UBR connections and to VBR traffic controller 14B for VBR connections.

To impart flexibility to the switch, each of the parameters m, $\rho_{CBR}$, $\alpha$, $\beta$ and $\rho_{VBR}$ can be varied independently by the switch operator. If the switch operator wishes to be more or less aggressive than the switch manufacturer, the switch operator can increase or decrease the parameters m, $\rho_{CBR}$, $\alpha$, $\beta$ and $\rho_{VBR}$. However, the effect of changing one or more of the parameters m, $\rho_{CBR}$, $\alpha$, $\beta$ and $\rho_{VBR}$ on the switch may not be readily apparent to the switch operator. The switch operator may need a trial and error process to fully understand how to achieve his or her goals. However, the bandwidth of existing connections cannot be reallocated unless the existing connections are terminated. Because of quality of service and reliability issues, it is impermissible to terminate connections. Accordingly, a mechanism is necessary to allow a switch operator to vary the connection admission control system when the switch is in use. To this end, the present invention allows the switch operator to vary the parameters m, $\rho_{CBR}$, $\alpha$, $\beta$ and $\rho_{VBR}$ for new connections only, without disturbing existing connections. When an existing connection is terminated, bandwidth is reallocated based on the new parameters m, $\rho_{CBR}$, $\alpha$, $\beta$ and $\rho_{VBR}$.

When an existing connection is terminated, it is essential that the bandwidth freed up for new connections is equivalent to the bandwidth originally allocated for the connection terminated. Otherwise, bandwidth could be permanently lost or the switch could be overloaded. To keep track of the bandwidth allocated, the admission controller 22 is connected to a memory 24. When a new connection is established, the memory 24 stores the nominal bandwidth allocated for that connection. When the connection is terminated, the memory 24 is used to determine how much bandwidth has been freed up by the termination.

There are two basic cases that need to be considered when changing the CAC parameters while the switch is in operation. First, the allocated bandwidth of existing connections may decrease because of the change. CAC recalculates the bandwidth requirements for effected classes of service at each link (congestion point) within the switch. This process is done stepwise, link-by-link until the recalculation is complete. There is no need to reroute existing connections and there is no strong time dependency between the reallocation of the first and last congestion point. It is therefore possible to continue processing connections even as the bandwidth is being reallocated.

Second, changing one or more of the CAC parameters while the switch is in operation may cause the allocated bandwidth to increase. This results in a temporary over subscription of capacity. For example, assume that the scaling parameter $\beta$ is increased from 1 to 2. If the bandwidth available for allocation (TBW·$\rho$) is 622 Mbps and 500 Mbps is already allocated for existing VBR connections, the allocated bandwidth for existing VBR connections effectively becomes 10000 Mbps. Although the bandwidth allocated is now greater than the capacity, the actual traffic has not changed. There is therefore no need to drop connections in order to make them fit within the 622 Mbps link. However, no new connections will be accepted through this link since there is no excess capacity available. Eventually, the existing connections will terminate, freeing up bandwidth. When the allocated bandwidth decreases below 622 Mbps, new connections will once again be accepted. This mechanism provides a graceful way for switch operators to tune their system while not disrupting service. This same method works whenever changing any of the CAC parameters m, $\rho_{CBR}$, $\alpha$, $\beta$ and $\rho_{VBR}$.

The invention has been described in connection with the device shown in FIG. 2. In practice, however, the invention may be implemented with one or more application specific integrated circuits (ASICs), or more likely, with software.

While the invention has been described in connection with the preferred embodiments, it will be understood that modifications within the principles outlined above will be evident to those skilled in the art. For example, the allocation for CBR connections is described as not being reduced by the scaling parameter $\beta$, and this is due to the current standards for CBR connections. However, because the bit rates of CBR connections do vary, it is certainly possible that connections analogous to CBR connections would be allocated a reduced bandwidth. The invention is not limited to the preferred embodiments, but is intended to encompass such modifications.

What is claimed is:

1. A connection admission control method for a packet-based switching system, comprising:
   assigning equivalent bandwidths to variable speed connections;
   increasing or reducing the equivalent bandwidths of the variable speed connections by a scaling factor to achieve an assigned bandwidth;
   adjusting the scaling factor to change the assigned bandwidths, the adjustment being made by a switch operator;

determining whether to accept or refuse new variable speed connections based on whether the sum of assigned bandwidths for existing variable speed connections and new variable speed connections exceeds a bandwidth available to variable speed connections; and increasing or reducing the bandwidth available to variable speed connections by a variable speed traffic factor; and adjusting the variable speed traffic factor, the adjustment being made by a switch operator.

2. A connection admission control method according to claim 1, wherein the scaling factor and the variable speed traffic factor are adjusted while the packet-based switching system is online.

3. A connection admission control method for a packet-based switching system, comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator; and determining whether to accept or refuse new variable speed connections based on whether the sum of assigned bandwidths for existing variable speed connections and new variable speed connections exceeds a bandwidth available to variable speed connections, wherein the connection admission control method determines whether to accept or refuse new constant speed connections and new variable speed connections, the method further comprising:

summing existing and new constant speed connections;

if the sum for existing and new constant speed connections exceeds a maximum factor, reducing a bandwidth available to constant speed connections; and adjusting the maximum factor, the adjustment being made by a switch operator.

4. A connection admission control method according to claim 3, further comprising the step of:

determining whether to accept or refuse new constant speed connections based on whether the sum of existing and new constant speed connections exceeds the bandwidth available to constant speed connections.

5. A connection admission control method for a packet-based switching system, comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator; and determining whether to accept or refuse new variable speed connections based on whether the sum of assigned bandwidths for existing variable speed connections and new variable speed connections exceeds a bandwidth available to variable speed connections wherein the connection admission control method determines whether to accept or refuse new constant speed connections and new variable speed connections, the method further comprising:

summing existing and new constant speed connections;

if the sum for existing and new constant speed connections exceeds a maximum factor, reducing a bandwidth available to constant speed connections; and adjusting the maximum factor, the adjustment being made by a switch operator, wherein the bandwidth available to constant speed connections is reduced by a constant speed traffic factor if the sum of bandwidths for existing and new constant speed connections exceeds the maximum factor, the method further comprising the step of adjusting the constant speed traffic parameter, the adjustment being made by a switch operator.

6. A connection admission control method according to claim 5, wherein the scaling factor, the maximum factor and the constant speed traffic factor are adjusted while the packet-based switching system is online.

7. A connection admission control method for a packet-based switching system, comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator; and determining whether to accept or refuse new variable speed connections based on whether the sum of assigned bandwidths for existing variable speed connections and new variable speed connections exceeds a bandwidth available to variable speed connections, wherein the connection admission control method determines whether to accept or refuse new unspecified connections and new variable speed connections, at least a portion of the unspecified connections not having a sustained cell rate, the sustained cell rate being determined based on an SCR factor, the method further comprising the step of adjusting the SCR factor, the adjustment being made by a switch operator.

8. A connection admission control method according to claim 7, wherein the sustained cell rate for unspecified connections is determined by multiplying a peak cell rate by the SCR factor.

9. A connection admission control method according to claim 7, further comprising:

assigning equivalent bandwidths to unspecified connections;

increasing or reducing the equivalent bandwidths of the unspecified connections by the scaling factor to achieve assigned bandwidths; and determining whether to accept or refuse new unspecified connections based on whether the sum of assigned bandwidths for existing and new unspecified connections exceeds a bandwidth available to unspecified connections.

10. A connection admission control method according to claim 9, wherein the scaling factor and the SCR factor are adjusted while the packet-based switch is online.

11. A connection admission control method for a packet-based switching system, comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator;

determining whether to accept or refuse new variable speed connections based on whether the sum of assigned bandwidths for existing variable speed connections and new variable speed connections exceeds a bandwidth available to variable speed connections;

maintaining an original scaling factor for all existing variable speed connections;

using a new scaling factor to allocate bandwidth for all new variable speed connections; and when an existing variable speed connection is terminated, freeing an assigned bandwidth determined by the original scaling factor and reallocating freed bandwidth based on the new scaling factor.

12. A connection admission control method according to claim 1, wherein the connection admission control method determines whether to accept or refuse new constant speed connections and new variable speed connections, the method further comprising:

summing existing and new constant speed connections;

if the sum of existing and new constant speed connections exceeds a maximum factor, reducing a bandwidth available to constant speed connections by a constant speed traffic factor; and adjusting the constant speed traffic factor, the adjustment being made by a switch operator.

13. A connection admission control method according to claim 1, wherein adjusting the scaling factor and the variable speed traffic factor causes different scaling factors and variable speed traffic factors to be used when different variable speed connections are evaluated for acceptance, the packet-based switching system stores the scaling factors and variable speed traffic factors used when existing constant speed connections were accepted, and a new variable speed connection is accepted if the following equation is satisfied:

$$EBW_1 \cdot \beta_1/\rho_{VBR,1} + EBW_2 \cdot \beta_2/\rho_{VBR,2} + EBW_3 \cdot \beta_3/\rho_{VBR,3} \cdots + \cdots EBW_n \cdot \beta_n/\rho_{VBR,n} \leq TBW_{VBR} \quad (4)$$

where one of $EBW_1$ to $EBW_n$ is the nominal equivalent bandwidth for the new variable speed connection, the others of $EBW_1$ to $EBW_n$ are the nominal equivalent bandwidths for existing variable speed connections, one of $\beta_1$ to $\beta_n$ is the scaling factor used when equation (4) is evaluated, the others of one of $\beta_1$ to $\beta_n$ are the scaling factors used when the existing variable speed connections were accepted, one of $\rho_{VBR,1}$ to $\rho_{VBR,n}$ is the variable speed traffic factor used when equation (4) is evaluated, the others of $\rho_{VBR,1}$ to $\rho_{VBR,n}$ are the variable speed traffic factors used when existing variable speed connections were accepted, and $TBW_{VBR}$ is the bandwidth available to variable speed connections.

14. A connection admission control method for a packet-based switching system, comprising:

summing existing and new constant speed connections;

if the sum of existing and new constant speed connections exceeds a maximum factor, reducing a bandwidth available to constant speed connections by a constant speed traffic factor; and adjusting the constant speed traffic factor wherein adjusting the constant speed traffic factor causes different constant speed traffic factors to be used when different constant speed connections are evaluated for acceptance, the packet-based switching system stores the constant speed traffic factors used when existing constant speed connections were accepted, and a new constant speed connection is accepted if the following equation is satisfied:

$$CBR_1/\rho_{CBR,1} + CBR_2/\rho_{CBR,2} + CBR_3/\rho_{CBR,3} \cdots + \cdots CBR_n/\rho_{CBR,n} \leq TBW_{CBR} \quad (2)$$

where one of $CBR_1$ to $CBR_n$ is the nominal bit rate of the new constant speed connection, the others of $CBR_1$ to $CBR_n$ are the nominal bit rates of the existing constant speed connections, one of $\rho_{CBR,1}$ to $\rho_{CBR,n}$ is the constant speed traffic factor used when equation (2) is evaluated, the others of $\rho_{CBR,1}$ to $\rho_{CBR,n}$ are the constant speed traffic factor used when existing constant speed connections were accepted, and $TBW_{CBR}$ is the bandwidth available to constant speed connections.

15. A connection admission control method for a packet-based switching system, comprising:

determining sustained cell rates for unspecified connections not having a sustained cell rate, based on an SCR factor;

adjusting the SCR factor, the adjustment being made by a switch operator;

assigning equivalent bandwidths to unspecified connections;

increasing or decreasing the equivalent bandwidths of the unspecified connections by a scaling factor to achieve assigned bandwidths; and determining whether to accept or refuse new unspecified connections based on whether the sum of assigned bandwidths for existing and new unspecified connections exceeds a bandwidth available to unspecified connections.

16. A connection admission control method according to claim 15, wherein the scaling factor and the SCR factor are adjusted while the packet-based switch is online.

17. A connection admission control method according to claim 15, further comprising the step of adjusting the scaling factor, the adjustment being made by a switch operator, wherein:

adjusting the scaling factor causes different scaling factors to be used when different unspecified connections are evaluated for acceptance, the packet-based switching system stores the scaling factors used when existing unspecified connections were accepted, and a new unspecified speed connection is accepted if the following equation is satisfied:

$$EBW_1 \cdot \beta_1 + EBW_2 \cdot \beta_2 + EBW_3 \cdot \beta_3 \cdots + \cdots EBW_n \cdot \beta_n \leq TBW_{UBR} \quad (3)$$

where one of $EBW_1$ to $EBW_n$ is the nominal equivalent bandwidth for the new unspecified connection, the others of $EBW_1$ to $EBW_n$ are the nominal equivalent bandwidths for existing unspecified connections, one of $\beta_1$ to $\beta_n$ is the scaling factor used when equation (3) is evaluated, the others of one of $\beta_1$ to $\beta_n$ are the scaling factors used when the existing unspecified connections were accepted, and $TBW_{UBR}$ is the bandwidth available to unspecified connections.

18. A connection admission control method for a packet-based switching system, comprising:

determining sustained cell rates for unspecified connections not having a sustained cell rate, based on an SCR factor;

adjusting the SCR factor, the adjustment being made by a switch operator;

summing existing and new constant speed connections;
if the sum of existing and new constant speed connections exceeds a maximum factor, reducing a bandwidth available to constant speed connections by a constant speed traffic factor; and
adjusting the constant speed traffic factor, the adjustment being made by a switch operator.

19. A connection admission control device for a packet-based switching system, comprising:
an EBW device to assign equivalent bandwidths to variable speed connections;
a scaling unit to increase or reduce the equivalent bandwidths of the variable speed connections by a scaling factor to achieve an assigned bandwidth, the scaling factor being adjustable to change the assigned bandwidths, the adjustment being made by a switch operator;
an admission control device to determine whether to accept or refuse new variable speed connections based on whether the sum of assigned bandwidths for existing variable speed connections and new variable speed connections exceeds a bandwidth available to variable speed connections; and
a variable traffic unit to increase or reduce the bandwidth available to variable speed connections by a variable speed traffic factor, the variable speed traffic factor being adjustable.

20. A connection admission control device according to claim 19, wherein the scaling factor and the variable speed traffic factor are adjustable while the packet-based switching system is online.

21. A connection admission control device according to claim 19, wherein the admission unit determines whether to accept or refuse new constant speed connections and new variable speed connections, the device further comprising:
a summing device to sum existing and new constant speed connections such that if the sum of existing and new constant speed connections exceeds a maximum factor, a bandwidth available to constant speed connections is reduced by a constant speed traffic factor, the constant speed traffic factor being adjustable.

22. A connection admission control device according to claim 19, wherein
adjusting the scaling factor and the variable speed traffic factor causes different scaling factors and variable speed traffic factors to be used when different variable speed connections are evaluated for acceptance,
the packet-based switching system stores the scaling factors and variable speed traffic factors used when existing constant speed connections were accepted, and
the admission unit accepts a new variable speed connection if the following equation is satisfied:

$$EBW_1 \cdot \beta_1/\rho_{VBR,1} + EBW_2 \cdot \beta_3/\rho_{VBR,2} + EBW_3 \cdot \beta_3/\rho_{VBR,3} \ldots + \ldots EBW_n \cdot \beta_n/\rho_{VBR,n} \leq TBWVBR \quad (4)$$

where one of $EBW_1$ to $EBW_n$ is the nominal equivalent bandwidth for the new variable speed connection, the others of $EBW_1$ to $EBW_n$ are the nominal equivalent bandwidths for existing variable speed connections, one of $\beta_1$ to $\beta_n$ is the scaling factor used when equation (4) is evaluated, the others of one of $\beta_1$ to $\beta_n$ are the scaling factors used when the existing variable speed connections were accepted, one of $\rho_{VBR,1}$ to $\rho_{VBR,n}$ is the variable speed traffic factor used when equation (4) is evaluated, the others of $\rho_{VBR,1}$ to $\rho_{VBR,n}$ are the variable speed traffic factors used when existing variable speed connections were accepted, and $TBW_{VBR}$ is the bandwidth available to variable speed connections.

23. A connection admission control device for a packet-based switching system, comprising:
an EBW device to assign equivalent bandwidths to variable speed connections;
a scaling unit to increase or reduce the equivalent bandwidths of the variable speed connections by a scaling factor to achieve an assigned bandwidth, the scaling factor being adjustable to change the assigned bandwidths, the adjustment being made by a switch operator; and
an admission control device to determine whether to accept or refuse new variable speed connections based on whether the sum of assigned bandwidths for existing variable speed connections and new variable speed connections exceeds a bandwidth available to variable speed connections, wherein the admission unit determines whether to accept or refuse new constant speed connections and new variable speed connections, the device further comprising:
a summing device to sum existing and new constant speed connections such that if the sum for existing and new constant speed connections exceeds a maximum factor, a bandwidth available to constant speed connection is reduced, the maximum factor being adjustable.

24. A connection admission control device according to claim 23, wherein the admission unit determines whether to accept or refuse new constant speed connections based on whether the sum of existing and new constant speed connections exceeds the bandwidth available to constant speed connections.

25. A connection admission control device for a packet-based switching system, comprising:
an EBW device to assign equivalent bandwidths to variable speed connections;
a scaling unit to increase or reduce the equivalent bandwidths of the variable speed connections by a scaling factor to achieve an assigned bandwidth, the scaling factor being adjustable to change the assigned bandwidths, the adjustment being made by a switch operator; and
an admission control device to determine whether to accept or refuse new variable speed connections based on whether the sum of assigned bandwidths for existing variable speed connections and new variable speed connections exceeds a bandwidth available to variable speed connections
wherein the admission unit determines whether to accept or refuse new constant speed connections and new variable speed connections, the device further comprising:
a summing device to sum existing and new constant speed connections such that if the sum for existing and new constant speed connections exceeds a maximum factor, a bandwidth available to constant speed connection is reduced, the maximum factor being adjustable
wherein the bandwidth available to constant speed connections is reduced by a constant speed traffic factor if the sum of bandwidths for existing and new constant speed connections exceeds the maximum factor, the constant speed traffic parameter being adjustable.

26. A connection admission control device according to claim 25, wherein the scaling factor, the maximum factor and the constant speed traffic factor are adjustable while the packet-based switching system is online.

27. A connection admission control device for a packet-based switching system, comprising:
   an EBW device to assign equivalent bandwidths to variable speed connections;
   a scaling unit to increase or reduce the equivalent bandwidths of the variable speed connections by a scaling factor to achieve an assigned bandwidth, the scaling factor being adjustable to change the assigned bandwidths, the adjustment being made by a switch operator; and
   an admission control device to determine whether to accept or refuse new variable speed connections based on whether the sum of assigned bandwidths for existing variable speed connections and new variable speed connections exceeds a bandwidth available to variable speed connections
   wherein the admission unit determines whether to accept or refuse new unspecified connections and new variable speed connections, at least a portion of the unspecified connections not having a sustained cell rate, the device further comprising an SCR unit to determine the sustained cell rate based on an SCR factor, the SCR factor being adjustable.

28. A connection admission control device according to claim 27, wherein the SCR unit determines the sustained cell rate for unspecified connections by multiplying a peak cell rate by the SCR factor.

29. A connection admission control device according to claim 27, wherein
   the device further comprises an EBW device to assign equivalent bandwidths to unspecified connections,
   the scaling unit increases or reduces the equivalent bandwidths of the unspecified connections by the scaling factor to achieve assigned bandwidths, and
   the admission unit determines whether to accept or refuse new unspecified connections based on whether the sum of assigned bandwidths for existing and new unspecified connections exceeds a bandwidth available to unspecified connections.

30. A connection admission control device according to claim 29, wherein the scaling factor and the SCR factor are adjustable while the packet-based switch is online.

31. A device for a packet-based switching system, comprising:
   an EBW device to assign equivalent bandwidths to variable speed connections;
   a scaling unit to increase or reduce the equivalent bandwidths of the variable speed connections by a scaling factor to achieve an assigned bandwidth, the scaling factor being adjustable to change the assigned bandwidths, the adjustment being made by a switch operator; and
   an admission control device to determine whether to accept or refuse new variable speed connections based on whether the sum of assigned bandwidths for existing variable speed connections and new variable speed connections exceeds a bandwidth available to variable speed connections,
   wherein the admission unit:
   maintains an original scaling factor for all existing variable speed connections,
   uses a new scaling factor to allocate bandwidth for all new variable speed connections; and
   when an existing variable speed connection is terminated, frees an assigned bandwidth determined by the original scaling factor and reallocating freed bandwidth based on the new scaling factor.

32. A connection admission control device for a packet-based switching system, comprising:
   a summing device to sum existing and new constant speed connections; and
   a constant traffic unit to reduce a bandwidth available to constant speed connections by a constant speed traffic factor if the sum of existing and new constant speed connections exceeds a maximum factor, the constant speed traffic factor being adjustable
   wherein
   adjusting the constant speed traffic factor causes different constant speed traffic factors to be used when different constant speed connections are evaluated for acceptance,
   the packet-based switching system stores the constant speed traffic factors used when existing constant speed connections were accepted, and
   the device further comprises an admission unit to accept a new constant speed connection if the following equation is satisfied:

$$CBR_1/\rho_{CBR,1}+CBR_2/\rho_{CBR,2}+CBR_3/\rho_{CBR,3}\cdots+\cdots CBR_n/\rho_{CBR,n} \leq TBW_{CBR} \quad (2)$$

where one of $CBR_1$ to $CBR_n$ is the nominal bit rate of the new constant speed connection, the others of $CBR_1$ to $CBR_n$ are the nominal bit rates of the existing constant speed connections, one of $\rho_{CBR,1}$ to $\rho_{CBR,n}$ is the constant speed traffic factor used when equation (2) is evaluated, the others of $\rho_{CBR,1}$ to $\rho_{CBR,n}$ are the constant speed traffic factor used when existing constant speed connections were accepted, and $TBW_{CBR}$ is the bandwidth available to constant speed connections.

33. A connection admission control device for a packet-based switching system, comprising:
   an SCR unit to determine sustained cell rates for unspecified connections not having a sustained cell rate, based on an SCR factor, the SCR factor being adjustable, the adjustment being made by a switch operator;
   an EBW device to assign equivalent bandwidths to unspecified connections;
   a scaling unit to increase or decrease the equivalent bandwidths of the unspecified connections by a scaling factor to achieve assigned bandwidths; and
   an admission unit to determine whether to accept or refuse new unspecified connections based on whether the sum of assigned bandwidths for existing and new unspecified connections exceeds a bandwidth available to unspecified connections.

34. A connection admission control device according to claim 33, wherein the scaling factor and the SCR factor are adjustable while the packet-based switch is online.

35. A connection admission control device according to claim 33,
   further comprising adjusting the scaling factor, wherein:
   adjusting the scaling factor causes different scaling factors to be used when different unspecified connections are evaluated for acceptance,
   the packet-based switching system stores the scaling factors used when existing unspecified connections were accepted, and
   the admission unit accepts a new unspecified speed connection if the following equation is satisfied:

$$EBW_1 \cdot \beta_1 + EBW_2 \cdot \beta_2 + EBW_3 \cdot \beta_3 \cdots + \cdots EBW_n \cdot \beta_n \leq TBW_{UBR} \quad (3)$$

where one of $EBW_1$ to $EBW_n$ is the nominal equivalent bandwidth for the new unspecified connection, the others of $EBW_1$ to $EBW_n$ are the nominal equivalent bandwidths for existing unspecified connections, one of $\beta_1$ to $\beta_n$ is the scaling factor used when equation (3) is evaluated, the others of one of $\beta_1$ to $\beta_n$ are the scaling factors used when the existing unspecified connections were accepted, and $TBW_{UBR}$ is the bandwidth available to unspecified connections.

36. A connection admission control device according to claim 33, further comprising:
a summing device to sum existing and new constant speed connections; and
a constant traffic unit to reduce a bandwidth available to constant speed connections if the sum of existing and new constant speed connections exceeds a maximum factor, the maximum factor being adjustable.

37. A machine-readable medium storing a program to control a packet-based switch to perform a method comprising:
assigning equivalent bandwidths to variable speed connections;
increasing or reducing the equivalent bandwidths of the variable speed connections by a scaling factor to achieve an assigned bandwidth;
adjusting the scaling factor to change the assigned bandwidths, the adjustment being made by a switch operator;
determining whether to accept or refuse new variable speed connections based on whether the sum of assigned bandwidths for existing variable speed connections and new variable speed connections exceeds a bandwidth available to variable speed connections;
increasing or reducing the bandwidth available to variable speed connections by a variable speed traffic factor; and
adjusting the variable speed traffic factor, the adjustment being made by a switch operator.

38. A machine-readable medium according to claim 37, wherein the scaling factor and the variable speed traffic factor are adjusted while the packet-based switching system is online.

39. A machine-readable medium according to claim 37, wherein the connection admission control method determines whether to accept or refuse new constant speed connections and new variable speed connections, the method further comprising:
summing existing and new constant speed connections;
if the sum of existing and new constant speed connections exceeds a maximum factor, reducing a bandwidth available to constant speed connections by a constant speed traffic factor; and
adjusting the constant speed traffic factor, the adjustment being made by a switch operator.

40. A machine-readable medium according to claim 37, wherein
adjusting the scaling factor and the variable speed traffic factor causes different scaling factors and variable speed traffic factors to be used when different variable speed connections are evaluated for acceptance,
the packet-based switching system stores the scaling factors and variable speed traffic factors used when existing constant speed connections were accepted, and
a new variable speed connection is accepted if the following equation is satisfied:

$$EBW_1 \cdot \beta_1/\rho_{VBR,1} + EBW_2 \cdot \beta_2/\rho_{VBR,2} + EBW_3 \cdot \beta_3/\rho_{VBR,3} \ldots + \ldots EBW_n \cdot \beta_n/\rho_{VBR,n} \leq TBW_{VBR} \quad (4)$$

where one of $EBW_1$ to $EBW_n$ is the nominal equivalent bandwidth for the new variable speed connection, the others of $EBW_1$ to $EBW_n$ are the nominal equivalent bandwidths for existing variable speed connections, one of $\beta_1$ to $\beta_n$ is the scaling factor used when equation (4) is evaluated, the others of one of $\beta_1$ to $\beta_n$ are the scaling factors used when the existing variable speed connections were accepted, one of $\rho_{VBR,1}$ to $\rho_{VBR,n}$ is the variable speed traffic factor used when equation (4) is evaluated, the others of $\rho_{VBR,1}$ to $\rho_{VBR,n}$ are the variable speed traffic factors used when existing variable speed connections were accepted, and $TBW_{VBR}$ is the bandwidth available to variable speed connections.

41. A machine-readable medium storing a program to control a packet-based switch to perform a method comprising:
assigning equivalent bandwidths to variable speed connections;
increasing or reducing the equivalent bandwidths of the variable speed connections by a scaling factor to achieve an assigned bandwidth:
adjusting the scaling factor to change the assigned bandwidths, the adjustment being made by a switch operator; and
determining whether to accept or refuse new variable speed connections based on whether the sum of assigned bandwidths for existing variable speed connections and new variable speed connections exceeds a bandwidth available to variable speed connections,
wherein the connection admission control method determines whether to accept or refuse new constant speed connections and new variable speed connections, the method further comprising:
summing existing and new constant speed connections;
if the sum for existing and new constant speed connections exceeds a maximum factor, reducing a bandwidth available to constant speed connections; and
adjusting the maximum factor, the adjustment being made by a switch operator.

42. A machine-readable medium according to claim 41, the method further comprising:
determining whether to accept or refuse new constant speed connections based on whether the sum of existing and new constant speed connections exceeds the bandwidth available to constant speed connections.

43. A machine-readable medium storing a program to control a packet-based switch to perform a method comprising:
assigning equivalent bandwidths to variable speed connections;
increasing or reducing the equivalent bandwidths of the variable speed connections by a scaling factor to achieve an assigned bandwidth;
adjusting the scaling factor to change the assigned bandwidths, the adjustment being made by a switch operator; and
determining whether to accept or refuse new variable speed connections based on whether the sum of assigned bandwidths for existing variable speed connections and new variable speed connections exceeds a bandwidth available to variable speed connections
wherein the connection admission control method determines whether to accept or refuse new constant speed connections and new variable speed connections, the method further comprising:
summing existing and new constant speed connections;
if the sum for existing and new constant speed connections exceeds a maximum factor, reducing a bandwidth available to constant speed connections; and adjusting the maximum factor, the adjustment being made by a switch operator wherein the bandwidth available to constant speed connections is reduced by a constant speed traffic factor if the sum of bandwidths for existing and new constant speed connections exceeds the maximum factor, the method further comprising adjusting the constant speed traffic parameter, the adjustment being made by a switch operator.

44. A machine-readable medium according to claim 43, wherein the scaling factor, the maximum factor and the constant speed traffic factor are adjusted while the packet-based switching system is online.

45. A machine-readable medium storing a program to control a packet-based switch to perform a method comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator; and determining whether to accept or refuse new variable speed connections based on whether the sum of assigned bandwidths for existing variable speed connections and new variable speed connections exceeds a bandwidth available to variable speed connections wherein the connection admission control method determines whether to accept or refuse new unspecified connections and new variable speed connections, at least a portion of the unspecified connections not having a sustained cell rate, the sustained cell rate being determined based on an SCR factor, the method further comprising adjusting the SCR factor, the adjustment being made by a switch operator.

46. A machine-readable medium according to claim 45, wherein the sustained cell rate for unspecified connections is determined by multiplying a peak cell rate by the SCR factor.

47. A machine-readable medium according to claim 45, the method further comprising:

assigning equivalent bandwidths to unspecified connections;

increasing or reducing the equivalent bandwidths of the unspecified connections by the scaling factor to achieve an assigned bandwidth; and determining whether to accept or refuse new unspecified connections based on whether the sum of assigned bandwidths for existing and new unspecified connections exceeds a bandwidth available to unspecified connections.

48. A machine-readable medium according to claim 47, wherein the scaling factor and the SCR factor are adjusted while the packet-based switch is online.

49. A machine readable medium storing a program to control a packet-based switch to perform a method comprising:

assigning equivalent bandwidths to variable speed connections;

increasing or reducing the equivalent bandwidths of the variable speed connections by a scaling factor to achieve an assigned bandwidth;

adjusting the scaling factor to change the assigned bandwidths, the adjustment being made by a switch operator;

determining whether to accept or refuse new variable speed connections based on whether the sum of assigned bandwidths for existing variable speed connections and new variable speed connections exceeds a bandwidth available to variable speed connections maintaining an original scaling factor for all existing variable speed connections;

using a new scaling factor to allocate bandwidth for all new variable speed connections; and when an existing variable speed connection is terminated, freeing an assigned bandwidth determined by the original scaling factor and reallocating freed bandwidth based on the new scaling factor.

50. A machine-readable medium for controlling a packet-based switch to perform a method comprising:

summing existing and new constant speed connections;

if the sum of existing and new constant speed connections exceeds a maximum factor, reducing a bandwidth available to constant speed connections by a constant speed traffic factor; and adjusting the constant speed traffic factor wherein adjusting the constant speed traffic factor causes different constant speed traffic factors to be used when different constant speed connections are evaluated for acceptance, the packet-based switching system stores the constant speed traffic factors used when existing constant speed connections were accepted, and a new constant speed connection is accepted if the following equation is satisfied:

$$CBR_1/\rho_{CBR,1}+CBR_2/\rho_{CBR,2}+CBR_3/\rho_{CBR,3}\cdots+\cdots CBR_n/\rho_{CBR,n} \leq TBW_{CBR} \qquad (2)$$

where one of $CBR_1$ to $CBR_n$ is the nominal bit rate of the new constant speed connection, the others of $CBR_1$ to $CBR_n$ are the nominal bit rates of the existing constant speed connections, one of $\rho_{CBR,1}$ to $\rho_{CBR,n}$ is the constant speed traffic factor used when equation (2) is evaluated, the others of $\rho_{CBR,1}$ to $\rho_{CBR,n}$ are the constant speed traffic factor used when existing constant speed connections were accepted, and $TBW_{CBR}$ is the bandwidth available to constant speed connections.

51. A machine-readable medium storing a program to control a packet-based switch to perform a method comprising:

determining sustained cell rates for unspecified connections not having a sustained cell rate, based on an SCR factor;

adjusting the SCR factor, the adjustment being made by a switch operator;

assigning equivalent bandwidths to unspecified connections;

increasing or decreasing the equivalent bandwidths of the unspecified connections by a scaling factor to achieve assigned bandwidths; and determining whether to accept or refuse new unspecified connections based on whether the sum of assigned bandwidths for existing and new unspecified connections exceeds a bandwidth available to unspecified connections.

52. A machine-readable medium according to claim 51, wherein the scaling factor and the SCR factor are adjusted while the packet-based switch is online.

53. A machine-readable medium according to claim 51, the method further comprising adjusting the scaling factor, wherein:

adjusting the scaling factor causes different scaling factors to be used when different unspecified connections are evaluated for acceptance, the packet-based switching system stores the scaling factors used when existing unspecified connections were accepted, and a new unspecified speed connection is accepted if the following equation is satisfied:

$$EBW_1 \cdot \beta_1 + EBW_2 \cdot \beta_2 + EBW_3 \cdot \beta_3 \ldots + \ldots EBW_n \cdot \beta_n \leq TBW_{UBR} \quad (3)$$

where one of $EBW_1$ to $EBW_n$ is the nominal equivalent bandwidth for the new unspecified connection, the others of $EBW_1$ to $EBW_n$ are the nominal equivalent bandwidths for existing unspecified connections, one of $\beta_1$ to $\beta_n$ is the scaling factor used when equation (3) is evaluated, the others of one of $\beta_1$ to $\beta_n$ are the scaling factors used when the existing unspecified connections were accepted, and $TBW_{UBR}$ is the bandwidth available to unspecified connections.

54. A machine-readable medium storing a program to control a packet-based switch to perform a method comprising:

determining sustained cell rates for unspecified connections not having a sustained cell rate, based on an SCR factor;

adjusting the SCR factor, the adjustment being made by a switch operator;

summing existing and new constant speed connections;

if the sum of existing and new constant speed connections exceeds a maximum factor, reducing a bandwidth available to constant speed connections by a constant speed traffic factor; and adjusting the constant speed traffic factor, the adjustment being made by a switch operator.

* * * * *